Figure 11:
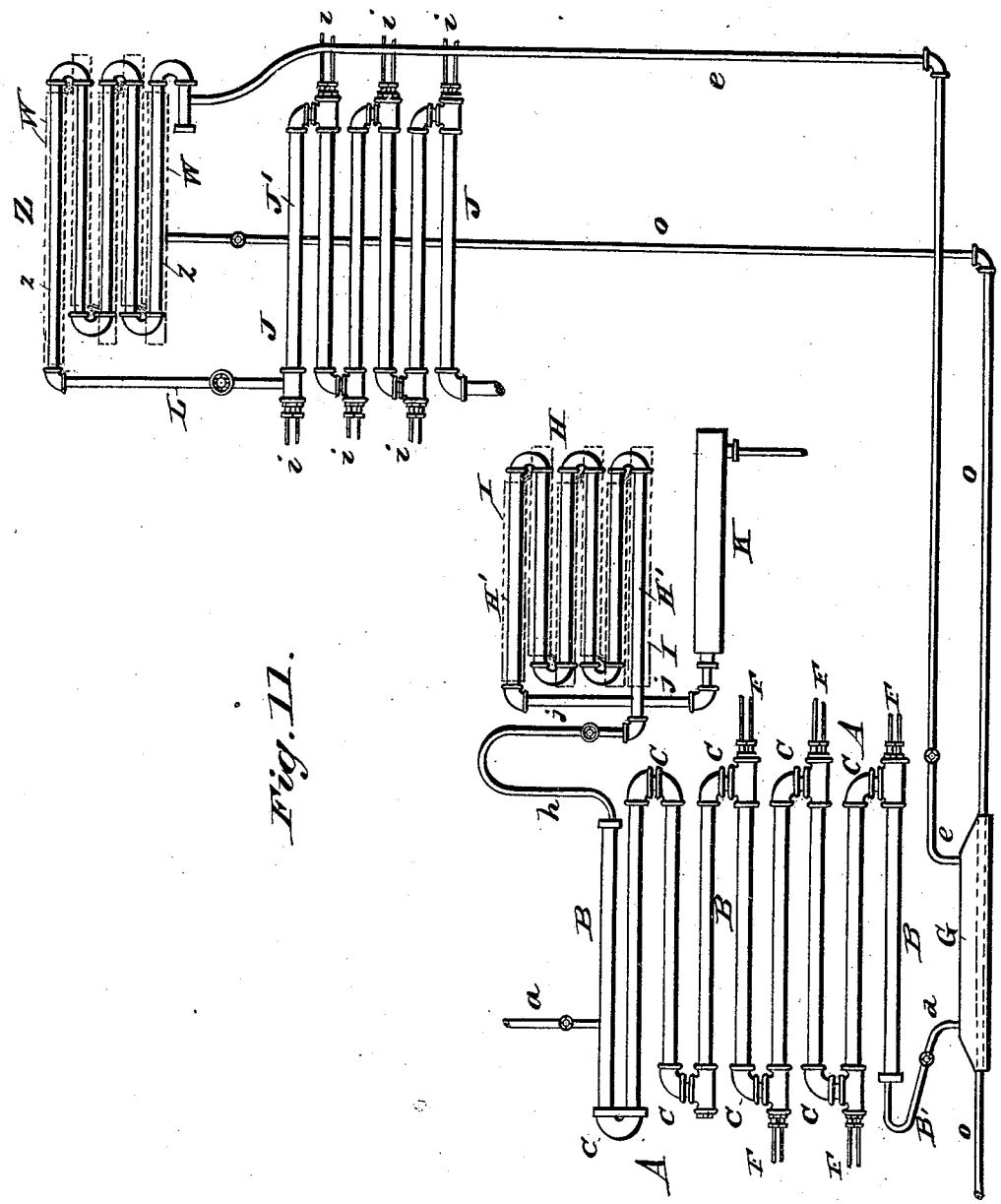

(No Model.) 4 Sheets—Sheet 1.
T. L. RANKIN.
ICE MACHINE.
No. 354,734. Patented Dec. 21, 1886.
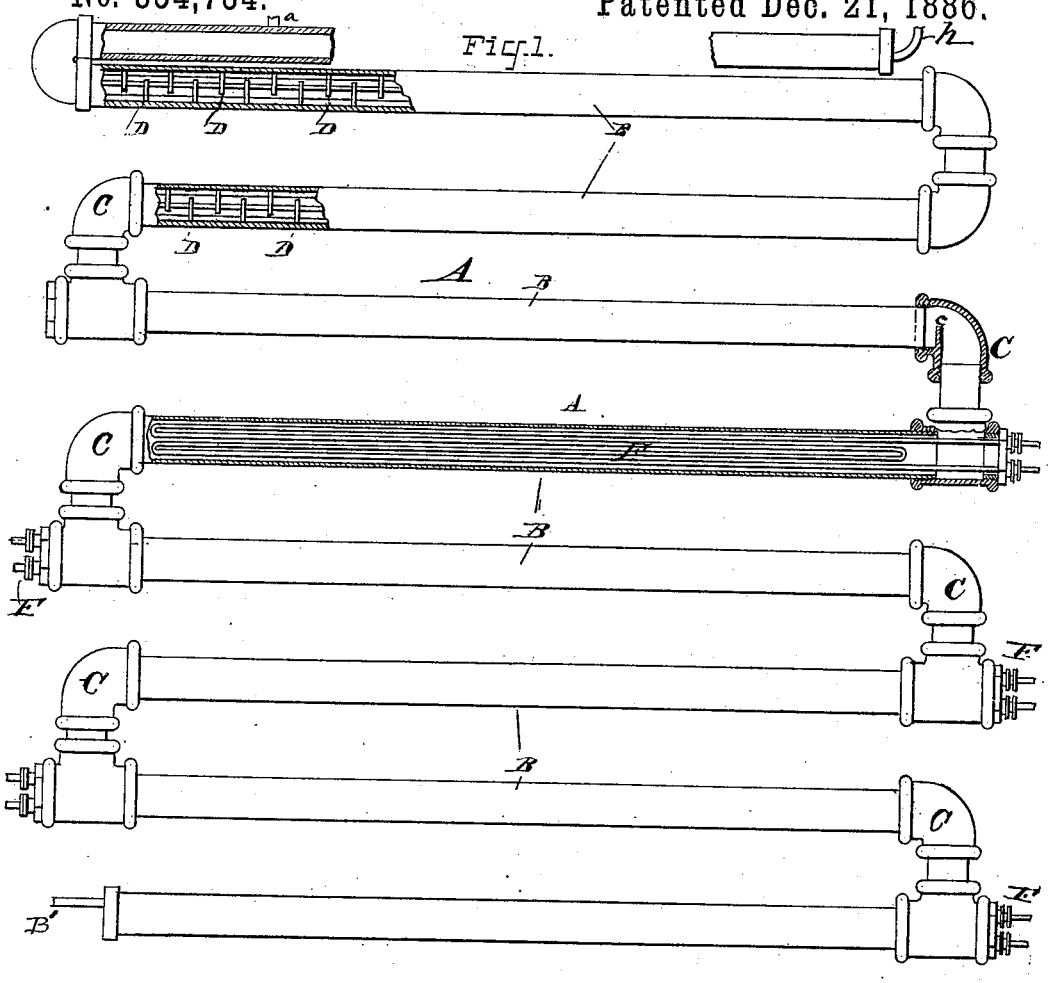
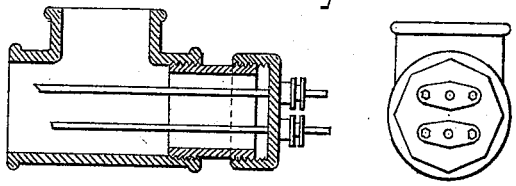
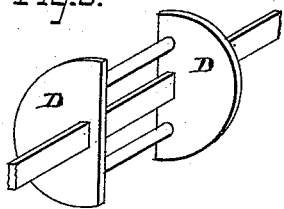
ATTEST: INVENTOR:

(No Model.)   4 Sheets—Sheet 2.
T. L. RANKIN.
ICE MACHINE.
No. 354,734.  Patented Dec. 21, 1886.
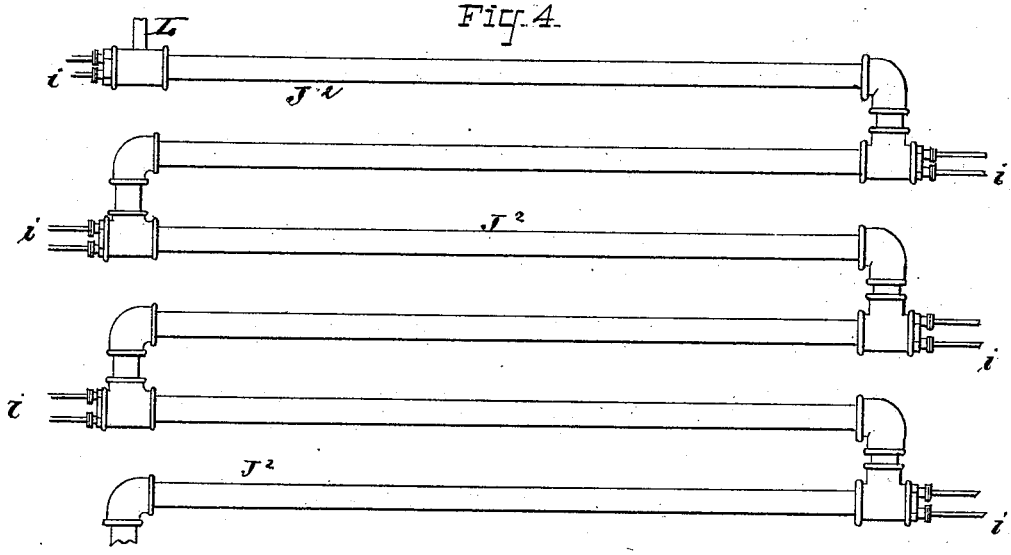
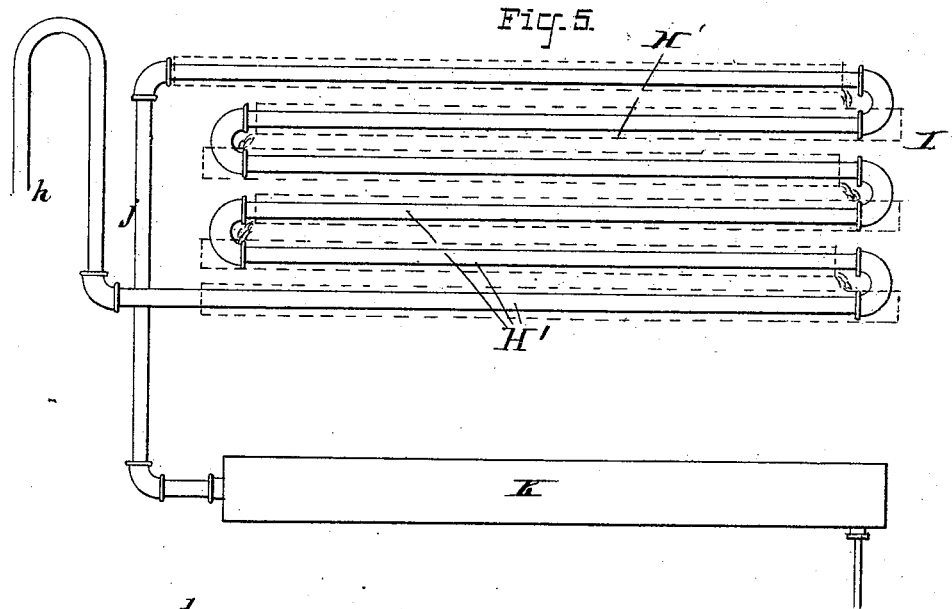
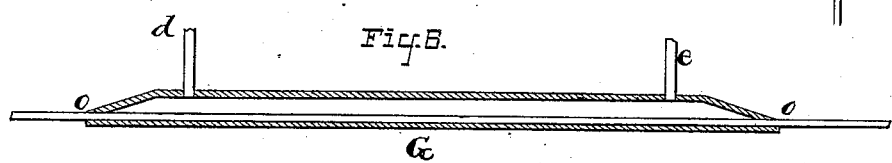
ATTEST:   INVENTOR:

(No Model.) 4 Sheets—Sheet 3.
T. L. RANKIN.
ICE MACHINE.
No. 354,734. Patented Dec. 21, 1886.
Fig. 7.
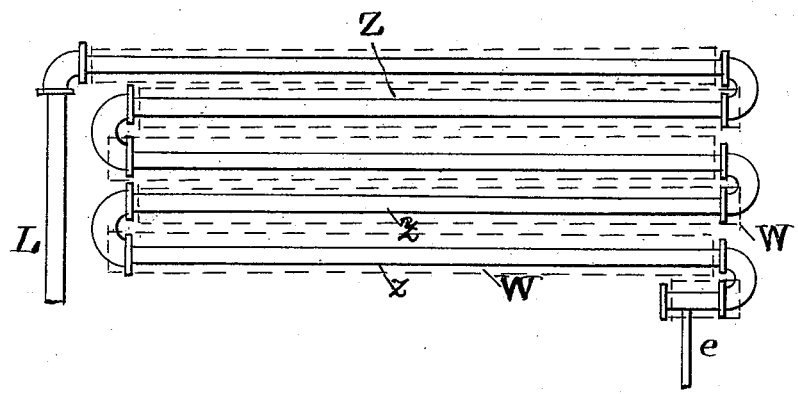
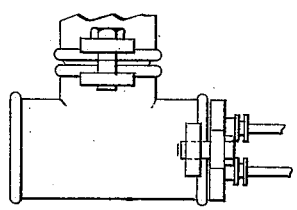
Fig. 8.
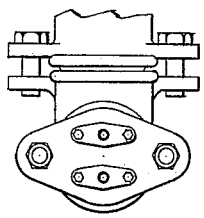
Fig. 9.
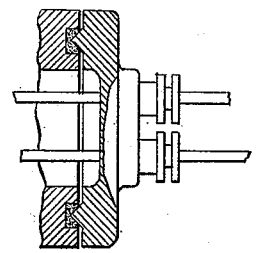
Fig. 10.
ATTEST: INVENTOR:

(No Model.) 4 Sheets—Sheet 4.

T. L. RANKIN.
ICE MACHINE.

No. 354,734. Patented Dec. 21, 1886.

WITNESSES
Phil C. Dieterich
A. E. Towell

INVENTOR
Thos. L. Rankin.
by
J. H. Alexander
Attorney

UNITED STATES PATENT OFFICE.

THOMAS L. RANKIN, OF NEW YORK, N. Y., ASSIGNOR TO JACOB W. SKINKLE, OF CHICAGO, ILLINOIS.

ICE-MACHINE.

SPECIFICATION forming part of Letters Patent No. 354,734, dated December 21, 1886.

Application filed January 5, 1883. Serial No. 81,018. (No model.)

*To all whom it may concern:*

Be it known that I, THOMAS L. RANKIN, of New York, in the county of New York and State of New York, have invented certain new and useful Improvements in Ice Machinery; and I do hereby declare that the following is a full, clear, and exact description thereof, reference being had to the accompanying drawings, and to the letters of reference marked thereon, which form part of this specification.

This invention is an improved apparatus for manufacturing ice, and for other refrigerating purposes, and is of simple construction, all parts being exposed to view, so that any leakage is at once apparent, and the apparatus can be easily repaired at little cost and with little inconvenience.

The invention consists in the construction and novel arrangement of parts hereinafter described, and pointed out in the appended claims.

In the accompanying drawings, Figure 1 is a side view, partly in section, of the still, forming part of the apparatus. Fig. 2 shows both a sectional and an end view of one of the end couplings or joints of the still-pipes. Fig. 3 is a perspective view of a detached portion of the still. Fig. 4 is a side view of the refrigerating portion of the apparatus. Fig. 5 is a side view of the condenser and gas-receiver. Fig. 6 is a side view of the equalizer. Fig. 7 is a side view of the absorber. Figs. 8, 9, and 10 are detail views of the end coupling-joints. Fig. 11 is a view of the machine with all the parts united.

Referring to the accompanying drawings, A designates the still portion of the apparatus, composed of a series of horizontal pipes, B, coupled at alternate ends by the coupling pieces or joints C, as shown. This still separates the ammoniacal gas from the water of the aqua-ammonia, and the dry gas passes thence to be compressed and then expanded, so as to produce cold, as in making ice.

One or more of the upper pipes in the still are provided with a series of alternating semi-partitions, D, connected by rods, as shown in Fig. 3, for a purpose hereinafter explained.

Two of the upper pipes are shown so provided in the drawings, Fig. 1. The coupling-joints are provided with the flanges or lips $c$, which are to keep the aqua-ammonia at a proper level in the still-pipes.

$a$ designates a tube leading into the highest still-pipe, through which tube the aqua-ammonia is fed to the still. The lower pipes of the still are provided with a series of return-bend steam-coils, F, which extend the entire length of each pipe and connect with a suitable steam-generator, by means of which the still-pipes and the contents thereof are heated.

From the highest pipe of the still extends a tube, $h$, leading into a condenser, H, Fig. 5, which consists of a series of tubes, H', extending back and forth through a series of troughs, I, through which a current of water is kept constantly flowing to cool the gas. The pipes H' are connected by a tube, $j$, with the receiver K, in which the gas is compressed.

The refrigerating portion of the apparatus consists of a series of pipes, $J^2 J^2$, jointed alternately at opposite ends by couplings similar to those of the still, and have passing longitudinally through them the small tubes $i\ i$, through which a current of brine or other suitable medium is pumped by proper mechanism to any required place.

The highest tube, $J^2$, of the refrigerating portion of the apparatus is provided with a pipe, L, that extends to the absorbers Z, consisting of the coupled sections of the pipes $z\ z$ in cooling-troughs W, the general construction of the absorber being similar to that of the condenser.

From the lowest pipe of the still extends a tube, B', the end $d$ of which opens into the jacket or outer tube of the equalizer G. $e$ is a tube extending from the equalizer-jacket to the lowest part of the absorber piping. The tube $e$ opens into the equalizer-jacket near the end opposite that into which the tube B' opens. The water coming from the still nearly exhausted of ammonia passes through the tube B' into the equalizer, and thence passes through the tube $e$ into the absorber, where it reabsorbs the gaseous ammonia that it meets there. From the absorber the re-enforced aqua-ammonia is carried to a tank or holder, whence it is delivered into the top of the still through the tube $a$. The renewed liquor-ammonia can be delivered immediately to the still through the tube $a$, which may run from the absorber to the still; but it is preferable to have a storage-tank in the circuit.

The equalizer consists of an outer tube or jacket welded at its ends upon the smaller tube o, which runs to and opens into the trough of the absorber, so that the cool water passes from the absorber through the hot water from the still, thus reducing the temperature of the water from the still and equalizing the temperature of the two waters. The various parts of the refrigerating apparatus may be located relative to each other at any suitable or convenient points, according to the purpose intended. The connection between the parts, as above described, will always be the same, the tubes only being bent in different directions. The said tubes are provided with suitable cocks or valves, whereby the flow of the gas and brine is properly controlled. The aqua-ammonia entering the still has heat applied to it by the coils of steam-pipe hereinafter described. The gas is driven off thereby and passes into the condenser, where it is liquefied and passed into the gas-receiver and held therein under a pressure equal to an expansion in bulk of about nine hundred and eighty volumes, so that when allowed to escape in small quantities it rapidly absorbs the heat from the brine-pipes, and the brine is cooled and flows to the place where the refrigeration takes place. When the gas has reached the absorber, its expansive force is exhausted, and it there meets the nearly exhausted water which has passed through the equalizer from the still and is reabsorbed thereby.

The equalizer serves to cool the water from the still and bring the same to nearly the same temperature as the expanded gas. Should steam be forced into the still in escaping upward, it has to pass through the cool aqua-ammonia coming in through the tube a, because said water moves in a swell or wave over and under the partial partitions D D; hence the steam is condensed, and the still is by this means adapted to be used in vessels and low cellars where other forms would be impracticable. The gas passes out of the still to the condenser and receiver, and thence it passes to the refrigerating part of the apparatus; thence to the absorber, where it meets the exhausted water from the still, which water has passed through the equalizer; thence (from the absorber) the water, renewed in strength, passes through the tube a and a tank on said tube (if such tank is desirable) to the still, as described.

The still, the absorber, the refrigerating apparatus, the condenser, and equalizer are all shown and described in a patent granted to me on the 28th day of April, 1885, and numbered 316,824, and are not claimed in the present application.

Having described my invention, I claim—

1. In an ammonia ice-machine or cooling apparatus, a still composed of a number of horizontal pipes, each heated by an entering steam-coil, and coupled and communicating at alternate ends and adapted to receive the water of ammonia into the highest pipe and have all the pipes only partially filled therewith, in combination with the removable partial partitions D D, adapted for insertion into one or more of the highest still-pipes, and arranged to cause the inflowing water of ammonia to condense the outflowing steam formed in the pipes, substantially as specified.

2. In a still of an ammonia ice-machine or cooling apparatus, the combination of the pipes B, which do not receive steam-coils, and provided with the ammonia-water inlet-pipe a, and gas and water outlet pipes h and B', respectively, with the steam-coils F, and partial partitions D, inserted and arranged in the highest pipes of the series, substantially as specified.

In testimony that I claim the foregoing as my own I affix my signature in presence of two witnesses.

THOMAS L. RANKIN.

Witnesses:
JOHN H. STITT,
T. H. ALEXANDER.